United States Patent [19]

Takeuchi

[11] Patent Number: 4,601,677

[45] Date of Patent: Jul. 22, 1986

[54] DUAL ACTION TORSION DAMPING DEVICE

[75] Inventor: Hiroshi Takeuchi, Higashiosaka, Japan

[73] Assignee: Kabushiki Kaisha Daikin Seisakusho, Neyagawa, Japan

[21] Appl. No.: 697,195

[22] Filed: Feb. 1, 1985

[30] Foreign Application Priority Data

Feb. 17, 1984 [JP] Japan .............................. 59-21852[U]

[51] Int. Cl.⁴ ............................................. F16D 3/14
[52] U.S. Cl. .................................. 464/68; 192/106.1; 464/85
[58] Field of Search .................. 192/106.1, 106.2; 464/66, 68, 85, 83

[56] References Cited

U.S. PATENT DOCUMENTS 2,571,291 10/1951 Reed ............................. 192/106.2 X
3,327,820 6/1967 Maurice ............................. 464/68 X
4,232,534 11/1980 Lamarche ..................... 192/106.2 X
4,279,132 7/1981 Lamarche ..................... 192/106.2 X
4,493,408 1/1985 Nagano ............................. 192/106.2

FOREIGN PATENT DOCUMENTS 2083592 3/1982 United Kingdom ................. 464/68

Primary Examiner—Stuart S. Levy
Assistant Examiner—Daniel P. Stodola
Attorney, Agent, or Firm—Armstrong, Nikaido, Marlmelstein & Kubovcik

[57] ABSTRACT

A damper disc including an integral flange provided on an outer periphery of a hub, first and second subplates and annular side plates in turn fitted rotatably onto the hub in an order nearer to the flange on hub outer peripheries on both sides of the flange, a weak torsion spring interposed between the flange and the first subplates, and strong torsion springs interposed in series between the first and second subplates and between the second subplates and the side plates.

7 Claims, 5 Drawing Figures

DUAL ACTION TORSION DAMPING DEVICE

FIELD OF THE INVENTION

This invention relates to a damper disc suitable for use in a clutch disc for an automobile, an agricultural machine, and an industrial machine etc. or for use in a damper for marine purpose etc.

DESCRIPTION OF THE PRIOR ART

A damper disc has already been developed, wherein subplates are provided between a hub flange and side plates and torsion rubbers are interposed in series between the flange and the subplates and between the subplates and the side plates. In this case, however, a relation between a twist angle $\theta$ and a transmission torque T of the damper disc becomes as shown in FIG. 1 and there included a trouble that a torsional rigidity (an inclination of characteristic curve) and a hysteresis torque (a vertical distance between characteristic curves) in the vicinity of a zero point (a neutral position of the damper disc) will become fairly large notwithstanding that plural torsion rubbers are interposed in series between them. For this reason, neutral sound (abnormal sound during idling) is apt to be generated from a power transmission system such as a transmission.

SUMMARY OF THE INVENTION

(Object of the Invention)

An object of this invention is to prevent neutral sound in a damper disc wherein torsion rubbers etc. are interposed in series between a hub flange and subplates and between the subplates and side plates.

(Composition of the Invention)

This invention is composed of a damper disc, in which an integral flange is provided on an outer periphery of a hub, first and second subplates and annular side plates are in turn rotatably fitted onto the hub in an order nearer to the flange on hub outer peripheries on both sides of the flange, a weak torsion spring is interposed between the flange and the first subplates, and strong torsion springs are interposed in series between the first and second subplates and between the second subplates and the side plates.

DETAILED DESCRIPTION OF THE INVENTION

Figure 2:
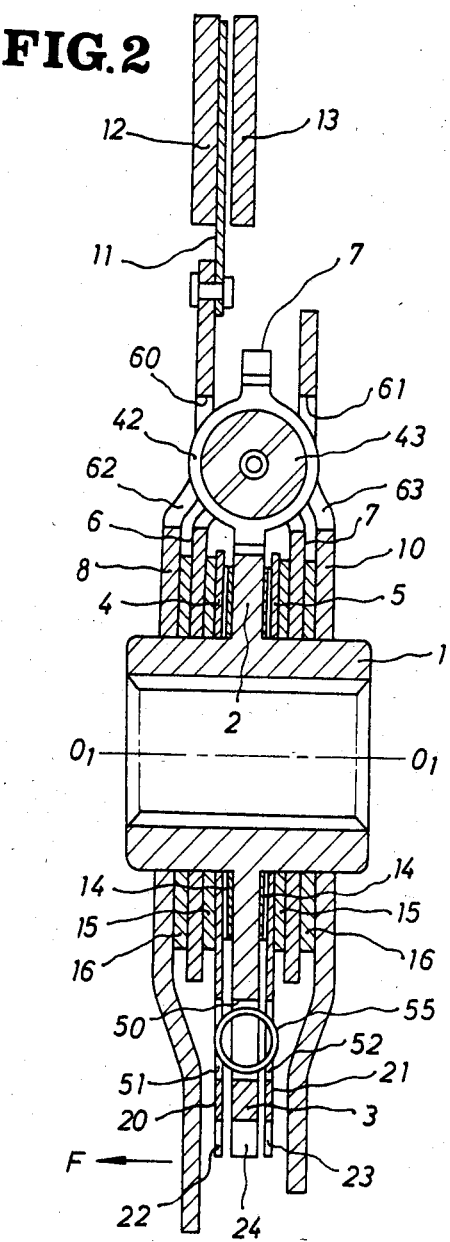
FIG. 2 is a partial sectional view of a damper disc according to the present invention taken on a line II—II of FIG. 3.

FIG. 2 is a vertical partial side view of an automobile clutch disc applied with this invention (an arrow F indicating a front side), and in this figure a spline hub 1 spline fits onto a horizontal main drive shaft (not shown). An integral annular flange 2 is provided on an outer periphery of the spline hub 1. In a radially outward portion thereof, the flange 2 has two circumferentially extending convex portions 3 (see FIG. 3) integral with flange 2. First subplates 4 and 5 and second subplates 6 and 7 are in turn fitted rotatably onto the hub 1 in an order nearer to the flange 2 on hub outer peripheries on both front and rear sides of the flange 2. The first subplates 4 and 5 and the second subplates 6 and 7 are formed into shapes as illustrated in FIG. 4. In FIG. 2, an annular clutch plate 8 and a retaining plate 10 (both being embodiments of the side plates) rotatably fit onto the hub 1 on hub outer peripheries on both front and rear sides of the second subplates 6 and 7. A cushioning plate 11 is fixed to an outer peripheral part of the clutch plate 8, and a pair of annular friction facings 12 and 13 are lined on both front and rear sides of the cushioning plate 11. A flywheel (not shown) of engine is disposed in front of the friction facings 12 and 13, and a pressure plate (not shown) is disposed at the rear of them, respectively. Wave springs 14 are interposed between the flange 2 and the first subplates 4 and 5. Further, friction washers 15 and 16 are interposed between the first subplates 4 and 5 and the second subplates 6 and 7 and between the second subplates 6 and 7 and the clutch plate 8 and the retaining plate 10, respectively.

Figure 3:
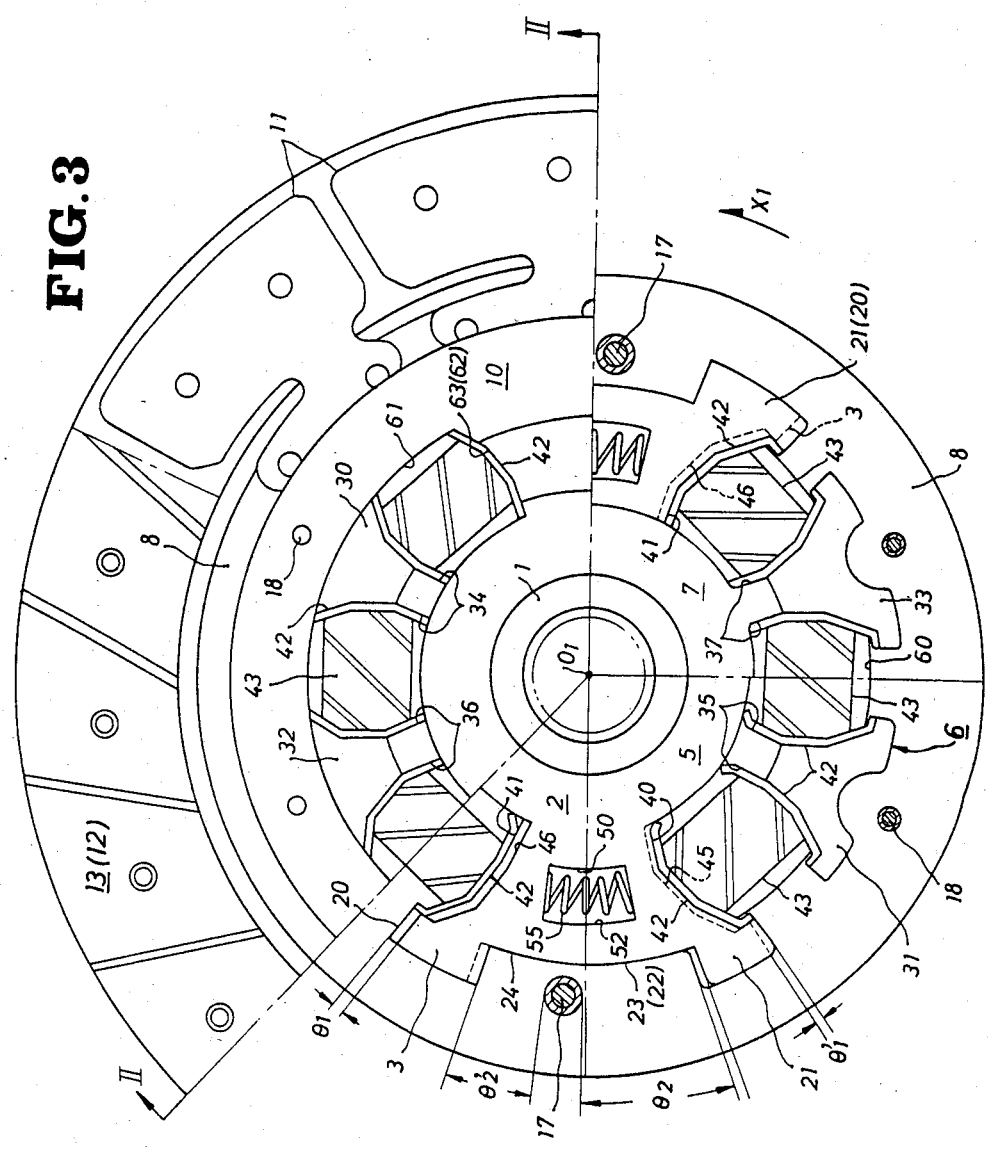
FIG. 3 is a partially fragmental partial rear view of the damper disc.
Figure 4:
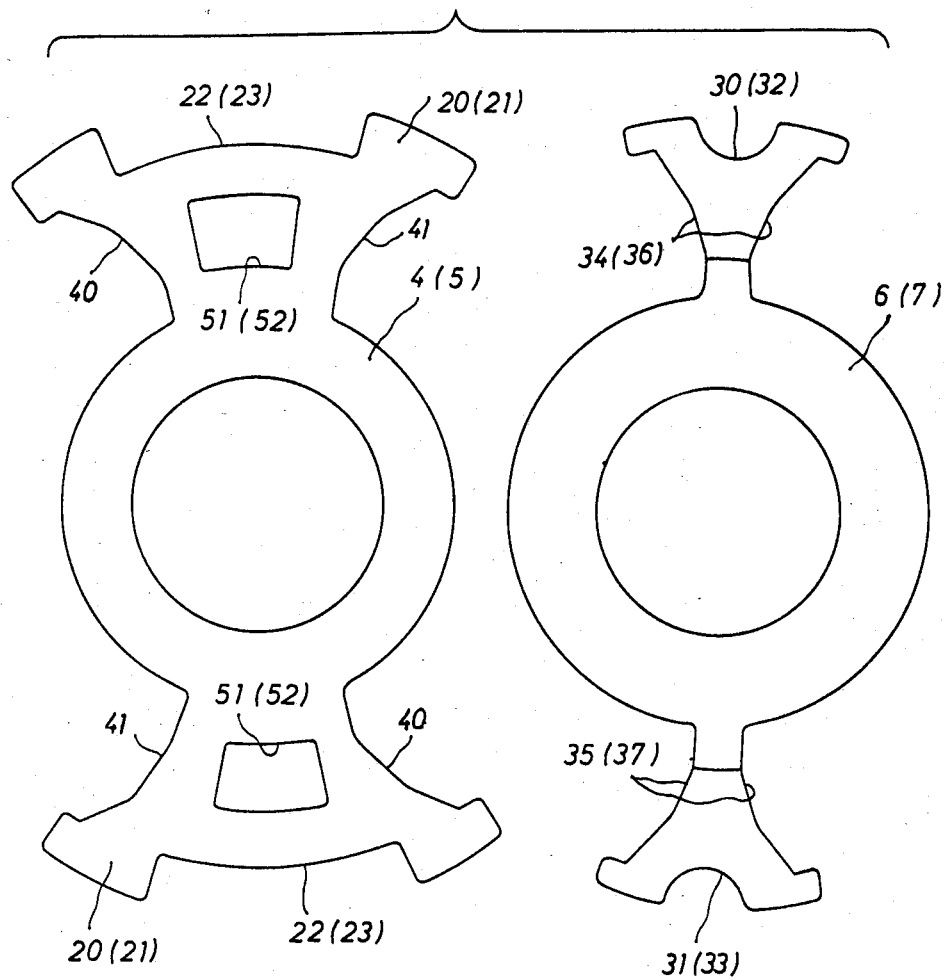
FIG. 4 is a front view of the subplates.

In FIG. 3 which is the partial rear view, both the clutch and retaining plates 8 and 10 are integrally connected to each other by means of a pair of stop pins 17 (stud pins) and another four stud pins 18. Each of the pair of first subplates 5(4) integrally provides convex portions 21(20) having an approximately same configuration as the convex portion 3 of the annular flange 2 and a slightly larger width than the convex portion 3 in the circumferential direction. Further, a notch 22(23) formed at an outer peripheral side end of the convex portion 20(21) is made longer in the circumferential direction than a notch 24 formed on an outer peripheral part of the convex portion 3 by a length of the slightly larger circumferential width of the convex portion 20(21). A difference of width between the convex portions 3 and 20(21) and a difference of length between the notches 23(22) and 24 correspond to angles $\theta_1$ and $\theta_1'$ having a disc center $0_1$ as their center respectively, and differences of distance between the stop pin 17 disposed in the notch 24 and circumferential end faces of the notch 24 correspond to angles $\theta_2$ and $\theta_2'$.

Respective subplates 6 and 7 integrally have two convex portions 30 and 31(32 and 33) extending on the same diametral line to an outer peripheral side as shown in FIG. 4, and respective convex portions 30 and 31(32 and 33) have recessions 34 and 35(36 and 37) at both circumferential ends respectively (see FIG. 4). The plates 6 and 7 are so disposed as shown in FIG. 3 that the convex portions 31, 31, 32 and 33 arranged with approximately same spaces provided therebetween in the disc circumferential direction between the convex portions 20 and 21. The convex portions 20 and 21 also have recessions 40 and 41 on the same circumference as the recessions 34, 35, 36 and 37, and rubber dampers 43 (an example of the strong torsion spring) are fitted in between the recessions 34, 35, 36, 37, 40 and 41 through spring seats 42 respectively. Under a neutral state of the disc, clearances corresponding to the angles $\theta_1$ and $\theta_1'$ are left between the seats 42 of the convex portions 20 and 21 sides and recessions 45 and 46 formed on circumferential both ends of the convex portion 3.

Further, on the convex portion 3 and the convex portions 20 and 21 there are formed holes 50, 51 and 52 extendedly existing in the disc circumferential direction and having the same shape, as shown in FIG. 2. Under the neutral state, the holes 50, 51 and 52 are disposed on such positions that they just agree each other when viewed in the direction of the disc center line $O_1$—$O_1$, and a coil spring 55 (an example of the weak torsion spring) extendedly existing in the disc circumferential direction is fitted in the holes 50, 51 and 52.

Moreover, each of the plates 8 and 10 have two circumferentially extending holes 60 and 61 in which a series of the seats 42 and the dampers 43 are fit. The holes 60 and 61 have at their circumferential both ends recessions 62 and 63 in which the spring seat 42 of the side of the convex portion 20 and 21 seats, and said seat 42 presses on the recessions 62 and 63 under the disc neutral state.

Figure 1:
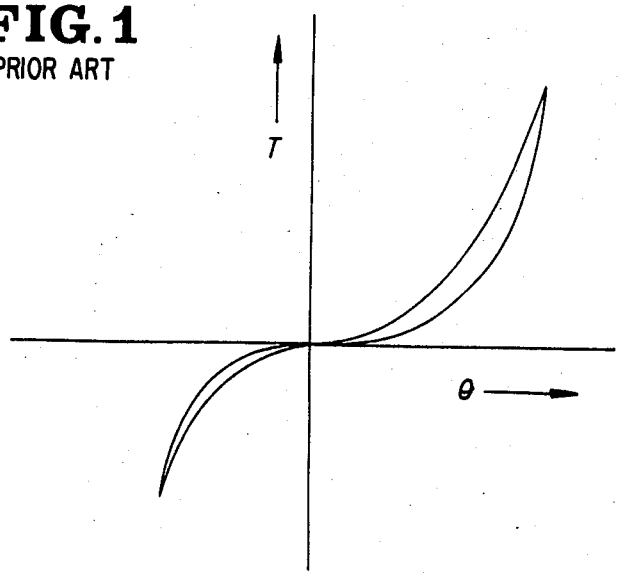
FIG. 1 is a graph showing a twist-angle/twist-torque characteristic of a conventional damper disc.
Figure 5:
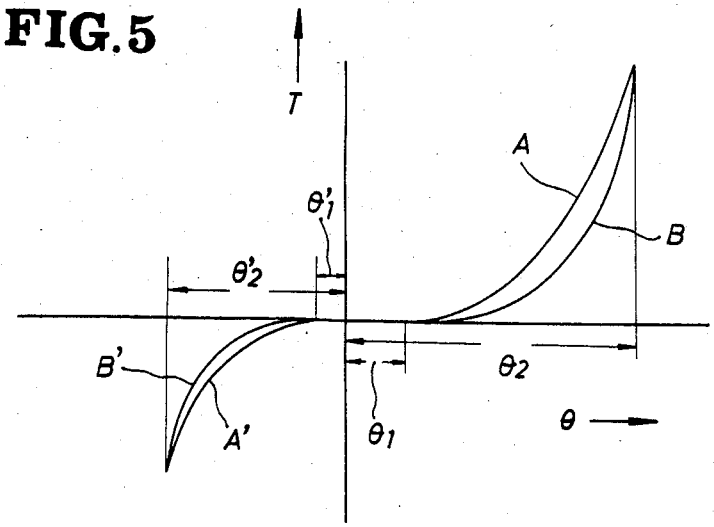
FIG. 5 is a graph showing a twist-angle/twist-torque characteristic of the damper disc according to the present invention.

Function of this damper disc will be described hereunder. When a twist torque is applied on the facings 12 and 13 relatively to the hub 1 in the direction of arrow $X_1$ of FIG. 3 for example, said twist torque will be transmitted through the plate 11, the plates 8 and 10, the seat 42, the damper 43, the second subplates 6 and 7 to the first subplates 4 and 5. Since the damper 43 has a high rigidity and functions as a rigid body thereat, a torsion will be generated between the plates 4 and 5 and the convex portion 3 to cause a compression of the spring 55. This torsion will last until the spring seat 42 contacting with the convex portions 20 and 21 contacts with the recession 46 of the convex portion 3, and an angle where the seat 42 contacts with the recession 46 corresponds to the torsion angle $\theta_1$ (FIG. 5). This first stage torsion will cause a friction on a surface of the wave spring 14 to produce a weak hysteresis torque (omitted in FIG. 5).

When the twist torque is further applied in the direction of $X_1$, the damper 43 will be compressed between the plates 8 and 10 and the convex portion 3, and this compression will last until the stop pin 17 contacts with the circumferential end face of the notch 24. When the disc is twisted to as large as the angle $\theta_2$ to cause a contact between the pin 17 and the notch 24, the torsion will never progress any more to achieve the maximum twist angle. In this instance, since the damper 43 is made of rubber, a hysteresis torque will be generated due to an internal friction at the time of compression. This hysteresis torque together with a friction torque caused by the friction washers 15 and 16 will offer a progressive relation as shown by A of FIG. 5.

When returning from the state of maximum twist angle, the damper 43 will expand first to provide a curve B of FIG. 5, thus a large hysteresis torque will be obtainable. When the torsion is released and the seat 42 at the side of the convex portions 20 and 21 seats on the recession 40, the plates 8 and 10 and the plate 6 and 7 will rotate integrally, the torsion between the plates 6 and 7 and the convex portion 3 will be released to permit the spring 55 to expand, thus the neutral state will be recovered as shown in FIG. 3.

The disc will function similarly also when it is twisted in the direction reverse to $X_1$. Namely, the spring 55 will be compressed within the angle $\theta_1'$ and the damper 43 will be compressed within the angle $\theta_2'$, thus curves A' and B' of FIG. 5 will be obtainable.

(Effect of Invention)

The integral flange 2 is provided on the outer periphery of the hub 1, first and second subplates 4,5,6,7 and annular side plates (for example, the clutch plate 8 and the retaining plate 10) are in turn rotatably fitted onto the hub in the order nearer to the flange 2 on the hub outer peripheries on both sides of the flange 2, the weak torsion spring (for example, the spring 55) is interposed between the flange 2 and the first subplates 4 and 5, and strong torsion springs (for example, the rubber dampers 43) are interposed in series between the first and second subplates 4,5,6 and 7, and between the second subplates 6 and 7 and the side plates 8 and 10; so that a wide twist angle, which has never been obtainable in the conventional damper disc interposing the torsion rubber etc. in series, can be achieved and at the same time a low twist torque range is widely obtainable in a low twist angle range, thus the advantage of eliminating the neutral sound can be provided.

(Another embodiment)

A rubber-like elastic body may be used for the weak torsion spring and a coil spring may be used for the strong torsion spring.

What is claimed is:

1. A damper disc comprising a hub having an integral flange provided on the outer periphery thereof, a clutch plate and a retaining plate rotatably fitted on said hub and disposed on opposite sides of said flange, a pair of first subplates and a pair of second subplates rotatably fitted on said hub, said first subplates being disposed on opposite sides of and adjacent to said flange, said second subplates being disposed between said first subplates and said clutch plate and retaining plate, a weak torsion spring operatively interposed between the flange and the first subplates, and a plurality of strong torsion springs arranged in groups, each group operatively interposed in series between the first and second subplates and between the second subplates and the clutch plate and the retaining plate.

2. A damper disc as set forth in claim 1, in which two flange convex portions projecting outwardly on the same diametral line are formed on said flange, first subplate convex portions which are slightly wider than said flange convex portions in the circumferential direction are integrally formed on said first subplates, and second subplate convex portions projecting outwardly on the same diametral line are integrally formed on said second subplates, said flange convex portions being superposed with respect to said first subplate convex portions, the first subplate convex portions and the second subplate convex portions are in turn disposed with spaces provided in the circumferential direction, and said strong torsion springs are interposed between the first subplate convex portions and the second subplate convex portions respectively.

3. A damper disc as set forth in claim 2, wherein said clutch plate and retaining plate are each formed with at least two circumferentially extending large holes correspondingly arranged to form hole pairs, and ends of each group of said strong torsion springs contact with circumferential end faces of the large holes under a free state of the disc.

4. A damper disc as set forth in claim 3, in which under the free state of the disc the circumferential ends of each group further contacts with said first subplate convex portions, and circumferential widths of the first subplate convex portions and the respective flange convex portion are so set that a distance corresponding to a prescribed angle of twist can be maintained between the respective end face of said group and said flange convex portion.

5. A damper disc as set forth in claim 4, in which small holes extending in the circumferential direction of disc are formed on said flange convex portion and the first subplate convex portion respectively, and said weak torsion spring is fitted in said small holes.

6. A damper disc as set forth in claim 5, in which a pair of stop pins parallel with a disc center line are installed between said side plates to integrally connect the clutch plate and retaining plate leaving a space therebetween, notches extending in the circumferential direction are formed on said flange convex portion and a disc outer peripheral side end of the first subplate convex portion respectively, and said stop pins engage with respective notches in such a manner as to be movable in the circumferential direction of disc.

7. A damper disc as set forth in claim 6, in which the notch of said first subplate is formed longer in the circumferential direction than the notch of said flange by a length corresponding to said prescribed angle.

* * * * *